United States Patent [19]
Tayar

[11] Patent Number: 5,451,083
[45] Date of Patent: Sep. 19, 1995

[54] LOADING BOW DEVICE FOR OPEN TENDERS

[76] Inventor: Eli Tayar, c/o Masgeriat Tal, Tel Josef 19132, Israel

[21] Appl. No.: 263,688

[22] Filed: Jun. 22, 1994

[51] Int. Cl.⁶ .............................................. B60P 3/00
[52] U.S. Cl. .......................................... 296/3; 296/43; 296/205
[58] Field of Search ....................... 296/3, 26, 43, 205

[56] References Cited

U.S. PATENT DOCUMENTS

| | | | |
|---|---|---|---|
| 4,078,175 | 7/1981 | Jackson | 296/3 X |
| 4,398,763 | 8/1983 | Louw | 296/3 |
| 4,405,170 | 9/1983 | Raya | 296/3 X |
| 4,444,427 | 4/1984 | Martin | 296/3 X |
| 4,770,458 | 9/1988 | Burke et al. | 296/3 |
| 4,779,916 | 10/1988 | Christie | 296/3 |
| 4,906,038 | 3/1990 | Morris | 296/3 X |
| 5,061,000 | 10/1991 | Haugen et al. | 296/3 |
| 5,143,415 | 9/1992 | Boudah | 296/3 |
| 5,190,337 | 3/1993 | McDaniel | 296/3 |
| 5,316,190 | 5/1994 | Bullock | 296/3 X |

*Primary Examiner*—Joseph D. Pape
*Attorney, Agent, or Firm*—Popham, Haik, Schnobrich & Kaufman, Ltd.

[57] ABSTRACT

A loading bow device for open bed trucks which includes a front bow extending parallel to the width of the passenger's cabin. Both lower sides of the front bow are connected to lower bars. Each lower bar is also connected to the top of the corresponding side wall of the open truck and to a movable back bow extending parallel to the front bow. The back bow is connected at a number of places on the lower bar or is movable thereon. The device is advantageously provided with removable upper bars extending parallel to the lower bars, connecting the front bow to the movable back bow. The lower and upper bars may be provided with a number of connection points for the fixation of the movable back bow.

5 Claims, 2 Drawing Sheets

LOADING BOW DEVICE FOR OPEN TENDERS

The present invention relates to a loading bow device for open Tenders.

Very often it is desirable to carry on a truck objects which are longer than the open truck. In commercial trucks the objects are loaded inside the open truck, the back door thereof is opened and the objects extend from the open truck outwards. The balance of the Tender is thus interfered and the driving becomes dangerous. There are known open Tenders which have an arrangement to carry long objects but they cannot carry high objects.

It has therefore been desirable to design a device which overcomes the above disadvantages i.e. would have the ability to carry long objects with safety on the one hand and have on the other hand the option of carrying high objects, would be simple to manufacture and use, would not be too expensive and would have the required properties.

In the present invention as defined and described herein "front" means the position near the passengers cabin and "back" means the position at the back side of the open Tender.

The present invention thus consists in a loading bow device for open Tenders comprising:

a. a front bow extending parallel to the width of the passengers cabin which is connected at both lower sides by suitable connecting means to b. bars (herein called "lower bar") each lower bar being connectable by suitable connecting means to the top of the corresponding side wall of the open truck; and c. a movable back bow extending parallel to the front bar which back bow being connectable to predetermined places on the lower bars or movable thereon.

The device is, advantageously, either:

1. in the open position, in which long objects may be loaded. The movable back bow is in this case connected to each lower bar at the back end thereof by suitable connecting means; and preferably also to the back end of removable bars (herein called "upper bars") extending from said front bar parallel to the lower bars and having the same length; or 2. in the closed position, in which high objects may be loaded. The movable back bow is in this case moved towards the front bar and optionally connected thereto. The back bow may be moved along the lower bars on rails, if present, or by any other suitable means. The upper bars, if any have in this case to be removed.

The bars may be connected to the sides of the lower bars by the connecting means of the back bow to the low bars.

The movable loading bow may be moved from the back to the front or vice versa, as follows:

The movable back bow may be connected to the lower and upper bars at predetermined fixed positions and may be moved from one fixed position to another one by removing same from one fixed position to a second one the connection being performed by any suitable connecting means.

The back bow may terminate at each side in a semi-rounded form and thus catches the lower bars at any desired place with the aid of connecting means.

The lower bars are preferably threaded into the front bow and is advantageously held therein by the aid of connecting means.

Alternatively each lower bar is provided with rail means in which the back bow may move along.

A bar in connection with the present invention means a bar proper, a rod, a pipe or the like.

The front bow and the movable back bow may be connected at their upper sides to foldable stoppers that are attached to the bows at spaced points of rotation by any suitable means. Said stoppers can be folded about their respective points of rotation to a position projecting above the front and back bows in order to provide additional assurance that objects will not slide out of the open Tender.

The lower bars may be connected to the top of the corresponding side wall of open truck by various means, preferably they are connected to these walls via some small bars which determine the height to the device and will also enable the insertion of ropes for tightening the objects to the device and/or the truck. The small bars will be connected to the bars and/or to the walls of the truck by any suitable connecting means.

The connecting means may be screws, pins, thread means etc.

All the parts may be made of any rigid material such as metal i.e. steel(preferably coated), stainless steel etc. rigid plastic i.e. P.V.C etc. Said material should preferably be weather resistant and non-corrosive.

The height of the front and of the back bows may extend, e.g. from the top of the walls of the open truck up to the top of the passengers cabin and even higher.

The length of the upper and lower bars corresponds to that of the length of the open truck.

A bow in connection with the present invention means a bar extending parallel to the width of the passenger cabin and two side bars connected the parallel bar. Said bow is preferably constituted as one unit. However, said bars may be separate parts being connected to each other. Each bar of the bows as well as the lower and upper bars may be comprised of small pieces which are connected to each other by suitable connecting means.

All parts may be folded in order that the device may be put into a box or the like.

The device is used as follows:

The front bow is connected at its sides to the corresponding lower and upper bars. Each lower bar may be connected directly or by small parts to the corresponding side wall of the open truck. When long objects have to be loaded on the open Tender the back bow is fixed to the upper and lower bars at the back end of the open truck. Whenever foldable stoppers are provided they are positioned to extend above the respective bow to which they are attached. When high objects have to be loaded the movable back bow is fixed near and parallel to the front bow and the upper bars are removed and may be put at any suitable location or fixed at the lower bars.

The present invention will now be illustrated with reference to the accompanying drawings, without being limited by them. Identical parts appearing in several drawings will be marked by the same numerals. Dots indicate connecting means. In said drawings.

Figure 1:
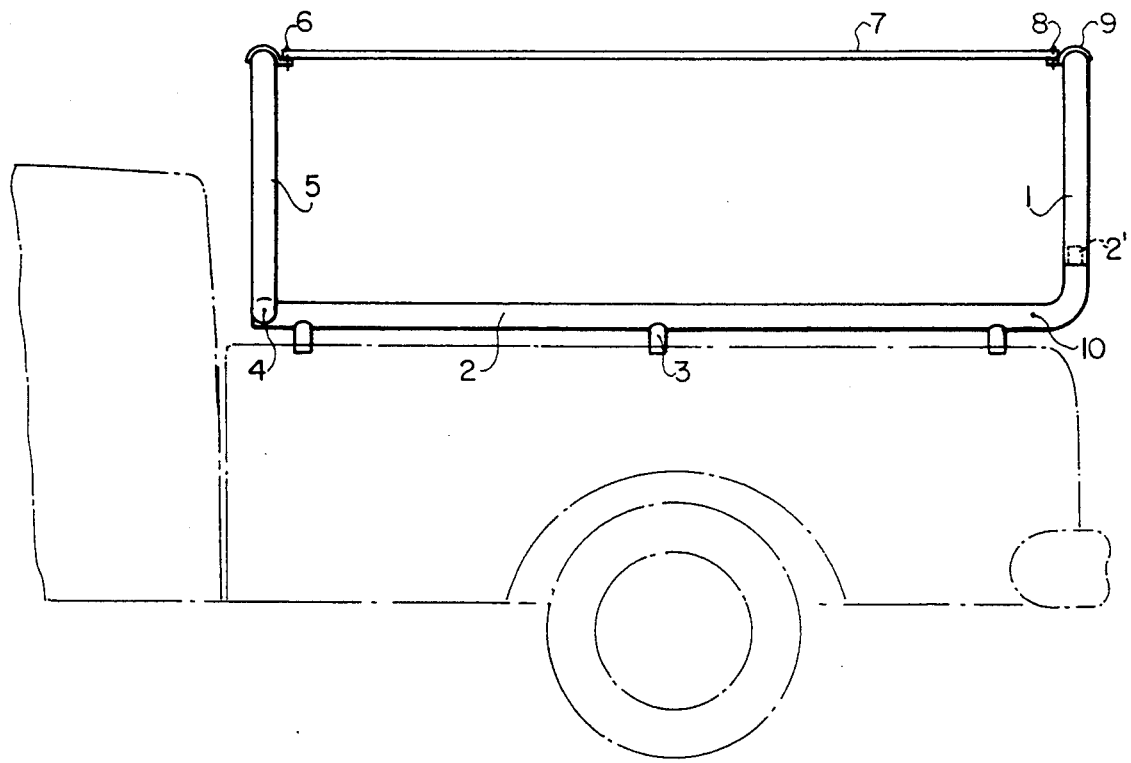
FIG. 1 shows a side view of the open position of a device according to the present invention.
Figure 4:
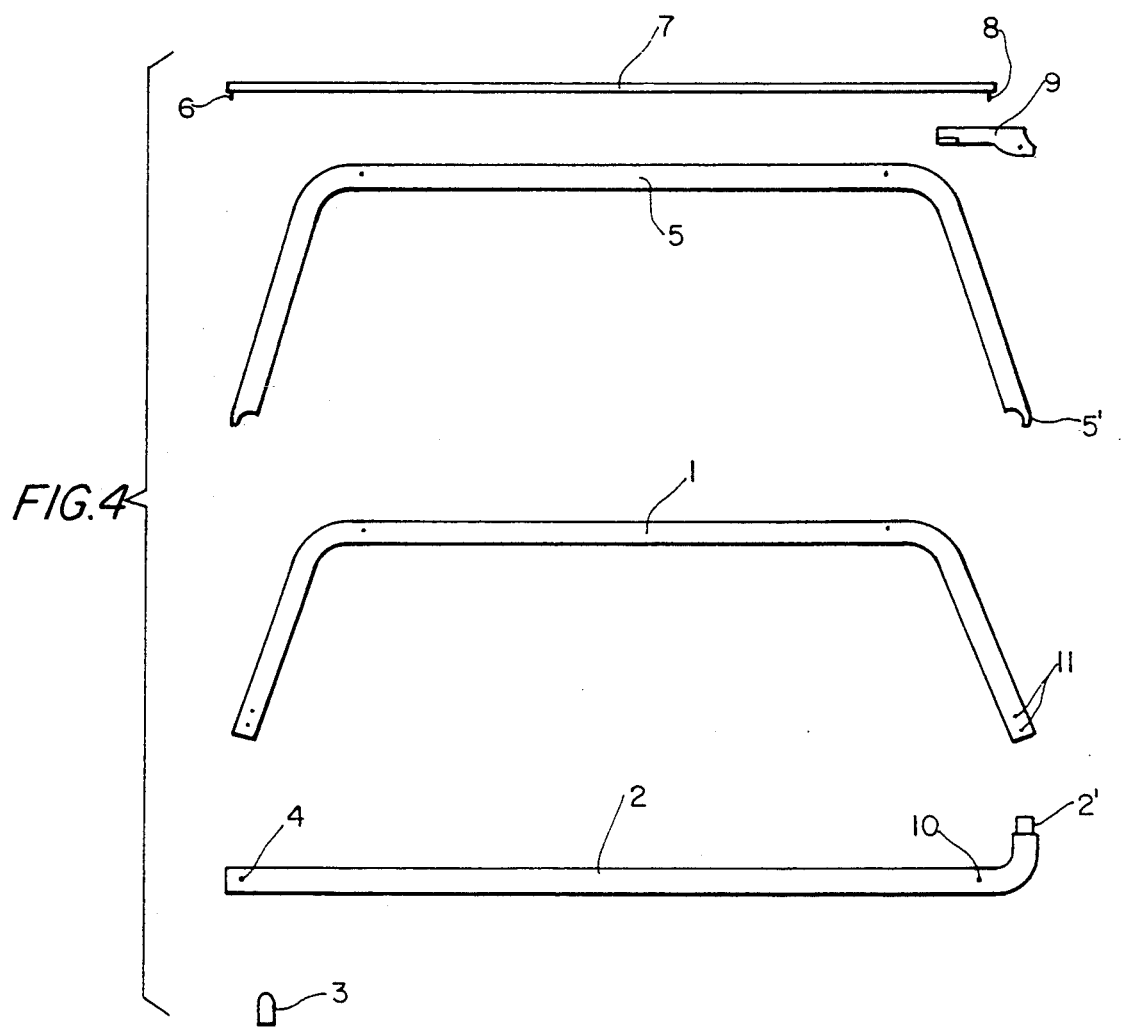
FIG. 4 shows the separate parts of a device according to the present invention.

In FIG. 1 lower bar 2 is threaded into front bow 1 by means 2' which in turn is held by connecting means 11 (seen only in FIG. 4). Lower bar 2 is connected by small bars 3 to the open truck of the Tender (not shown). Lower bar 2 is also connected by connecting means 4 to round ends 5' (seen only in FIG. 4) of movable back bow 5. Movable back bow 5 is also connected by connecting means 6 to upper bar 7 which is connected in turn to front bow 1 by connecting means 8.

Foldable stoppers 9 are mounted on front bow 1 and on movable back bow 5 at spaced points of rotation. Connecting means 6 and 8 include lips or tabs projecting from foldable stoppers 9, as shown in FIG. 1, and suitable connecting means such as bolts or screws that pass through bars 7 at either end and connect each bar, 7 to a respective lip or tab extending from a foldable stopper 9 at a point such that rotation of foldable stopper 9 about its respective point of rotation results in increasing the height of bar 7 relative to front and back bows 1 and 5.

Readily connecting means 10 for movable back bow 5 in the closed position are also shown.

Figure 2:
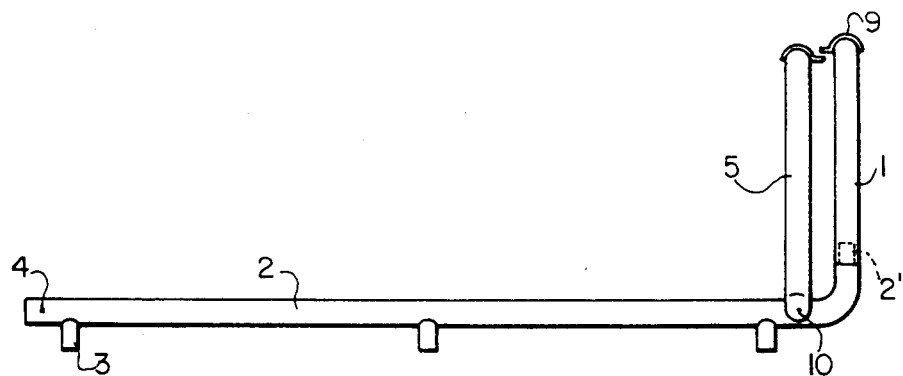
FIG. 2 shows a side view of the closed position of the device shown in FIG. 1.

In FIG. 2 the device of FIG. 1 is shown in the closed position wherein movable back bow 5 is connected by connecting means 10 to lower bar 2 and upper bar 7 has been removed.

As FIGS. 1 and 2 are sides view second parallel upper bars 7 are not shown.

Figure 3:
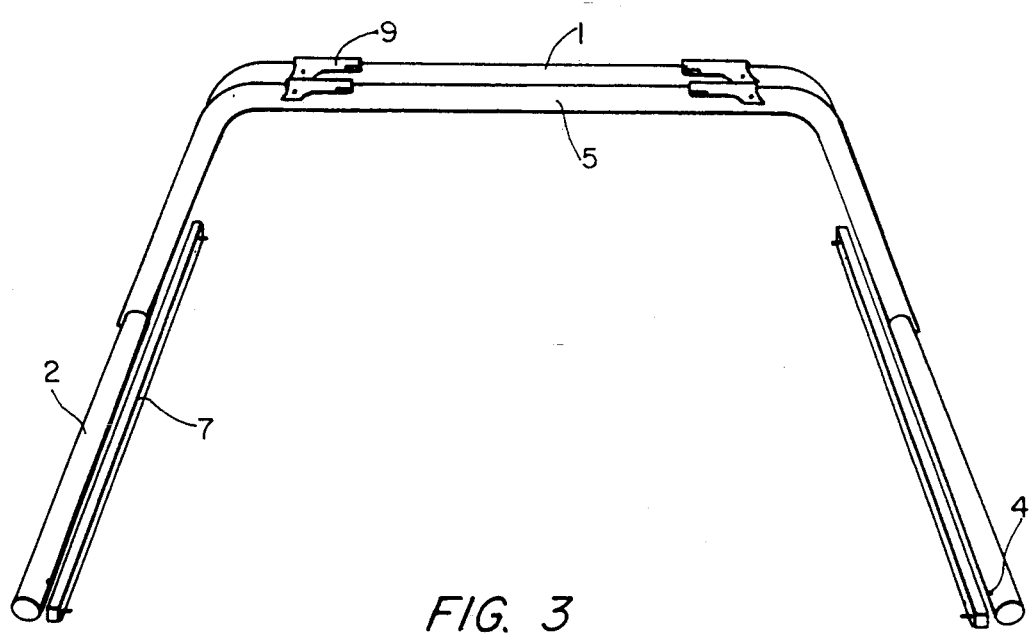
FIG. 3 shows a view from behind of the device shown in FIG. 2.

In FIG. 3, in the closed position, both bars 2 are shown. Both bars 7 are also shown. They were removed from the device and are connected to the sides of bars 2.

The parts shown in FIG. 4 are indicated by the same numerals as in FIGS. 1-3. In this FIG. threading means 2', semi-rounded 5' and connecting means 11 are shown.

Whenever one part is connected to another, although no specific connecting means are shown or described, it can be considered that they are connected by any suitable connecting means.

I claim:

1. A loading bow device for open bed trucks comprising: a front bow extending parallel to a width of a passenger cabin on said truck, said front bow having two ends;
    a back bow extending parallel to said front bow and having two ends, each of said two ends of said back bow having a semi-circular shape;
    lower bars, each extending along and adjacent a top edge of each of two side walls of an open bed truck, and said lower bars each having a length substantially equal to a length of said side walls;
    a plurality of additional support bars connected at right angles to said lower bars at spaced intervals and being of substantially shorter length than said lower bars;
    said lower bars each having a rounded outer periphery for mating with said two ends of said back bow at a plurality of positions along the lengths of said lower bars; and
    said front bow being connected at both ends to said lower bars in a position adjacent said passenger cabin.

2. The loading bow device of claim 1 further including upper bars extending substantially parallel to said lower bars and connecting said front bow to said back bow.

3. The loading bow device of claim 1 wherein said front bow is connected at both ends to said lower bars by threaded connections.

4. The loading device of claim 1 wherein said front bow, said back bow, and said lower bars are each constructed from a plurality of pieces whereby said front bow, said back bow and said lower bars can be collapsed for storage in a box.

5. The loading device of claim 1 further including foldable stoppers that are attached to the front bow and the back bow at spaced points and can be rotated about said spaced attachment points to extend above said front bow and said back bow.

* * * * *